United States Patent [19]

Nguyen et al.

[11] Patent Number: 4,695,933
[45] Date of Patent: Sep. 22, 1987

[54] MULTIPHASE DC-DC SERIES-RESONANT CONVERTER

[75] Inventors: Vietson M. Nguyen, Florissant, Mo.; P. John Dhyanchand; Pierre Thollot, both of Rockford, Ill.

[73] Assignee: Sundstrand Corporation, Rockford, Ill.

[21] Appl. No.: 700,449

[22] Filed: Feb. 11, 1985

[51] Int. Cl.$^4$ .......................................... H02M 3/335
[52] U.S. Cl. ........................................ 363/17; 363/40; 363/71; 363/98
[58] Field of Search .................. 307/3, 73, 82; 363/2, 363/3, 4, 7, 170, 40, 45, 47, 48, 71, 72, 79, 98

[56] References Cited

U.S. PATENT DOCUMENTS

| | | | |
|---|---|---|---|
| 3,492,560 | 1/1970 | Welsch | 363/3 |
| 3,571,692 | 3/1971 | Andren | 363/72 |
| 3,638,094 | 1/1972 | Ve Nard | 363/72 |
| 3,769,570 | 10/1973 | Stair | 363/3 |
| 3,927,362 | 12/1975 | Brewster | 363/3 |
| 3,953,779 | 4/1976 | Schwarz | 363/28 |
| 4,024,453 | 5/1977 | Corry | 363/28 |
| 4,143,414 | 3/1979 | Brewster et al. | 363/44 |
| 4,150,425 | 4/1979 | Nagano et al. | 363/71 |
| 4,195,333 | 3/1980 | Hadal | 363/21 |
| 4,290,101 | 9/1981 | Hergenhan | 363/21 |
| 4,323,959 | 4/1982 | Check | 363/28 |
| 4,336,584 | 6/1982 | Careglio | 363/28 |
| 4,338,658 | 7/1982 | Toy | 363/72 |
| 4,404,622 | 9/1983 | Cherry | 363/28 |
| 4,425,613 | 1/1984 | Shelly | 363/71 |
| 4,488,214 | 12/1984 | Chambers | 363/71 |
| 4,509,108 | 4/1985 | Gallios | 363/45 |
| 4,533,987 | 8/1985 | Tomofuji et al. | 363/72 |
| 4,609,828 | 9/1986 | Small | 363/71 |

FOREIGN PATENT DOCUMENTS

| | | | |
|---|---|---|---|
| 58-012573 | 1/1983 | Japan | 363/21 |
| 58-136266 | 8/1983 | Japan | 363/21 |

Primary Examiner—Patrick R. Salce
Assistant Examiner—Jeffrey Sterrett
Attorney, Agent, or Firm—Wood, Dalton, Phillips, Mason & Rowe

[57] ABSTRACT

Prior DC-DC converters of the resonant type often require the use of parallel-connected power switches to provide adequate current levels and further require large input and output filters. However, parallel operation of switching devices encounters the problem of current sharing and large filters are disadvantageous from a size and weight standpoint. Such problems are overcome by the DC-DC converter of the present invention which includes a plurality of subconverters having outputs which are combined to produce the output power. Each subconverter includes an inverter and a rectifier for developing a full wave rectified output having a ripple component therein. The subconverters are operated so that a phase displacement of $2\pi/N$ electrical degrees exists in the output current from one subconverter relative to the output current from other subconverters. The combined output therefore comprises a ripple component superimposed on a DC level, with the ripple component having a smaller amplitude and a greater frequency than the ripple component supplied by prior converters providing the same DC output level. The reduced ripple amplitude and increased frequency result in a reduction in size of the input and output filters. Further, since each subconverter handles only a portion of the total output power, parallel-connected switching devices need not be used.

10 Claims, 9 Drawing Figures

MULTIPHASE DC-DC SERIES-RESONANT CONVERTER

DESCRIPTION

1. Technical Field

The present invention relates generally to converter circuits, and more particularly to a DC-DC converter circuit for converting input DC power from a DC source into output DC power at a specified level.

2. Background Art

Various DC-DC converters have been developed for converting a first DC level from a DC source into a second DC level. One such converter is the series-resonant converter of either the half-bridge or full-bridge type. Such a converter includes a resonant LC circuit connected in series with the primary winding of a transformer and at least two switching elements for selectively connecting the DC source thereto. The switches are alternately operated near the resonant frequency of the resonant circuit to cause a sinusoidal current to be developed in the transformer primary winding. A corresponding sinusoidal AC current is developed in a secondary winding of the transformer which is rectified and filtered to develop the output DC power.

In such converters, it is desirable to employ switching devices such as power FET's which can be operated at high frequency with low switching losses so that filter sizes can be reduced, which exhibit no second-breakdown characteristics and which utilize low power base drive circuits. However, such devices currently are available only at low current ratings. Accordingly, it becomes necessary to operate two or more switching devices in parallel to provide high current handling capability. Such paralleling of devices, however, requires careful design and is generally expensive to maintain due to the problems associated with current sharing among parallel-connected devices.

Further, such DC-DC converters require large input and output filtering capacitors, a problem which is particularly acute in applications requiring small size and light weight, such as aircraft installations. This problem is exacerbated when the converter is of the full-bridge type in which the input current from the DC source swings from a positive to a negative value. In such a case, a large input filter is needed as an intermediate storage element in the circuit.

3. Summary of the Invention

In accordance with the present invention, a DC-DC converter utilizes high frequency switching devices without the necessity of operating such devices in parallel to that the problems of current sharing are avoided.

The converter includes a plurality of N successive DC-DC subconverters, each for converting the input DC power provided by a DC source into a subconverter output having a ripple component at a particular frequency. MEans are included for operating the N subconverters so that a phase displacement of $2\pi/N$ electrical degrees exists between successive converter output currents. The outputs of the subconverters are summed to develop an output current having a ripple component at a frequency equal to N times the frequency of a single subconverter. The ripple component in the output current is smoothed by an output filter which, due to the increased frequency and the decreased amplitude of the ripple component as compared with the output of prior converters, is relatively small in size.

Furthermore, each subconverter handles only a portion of the output current of the converter, and hence the switching devices need not be operated in parallel fashion.

The converter also includes means for detecting a malfunctioning subconverter and means for changing the frequency of operation of the remaining subconverters when such a malfunction is detected to maintain the output power at the specified level.

BEST MODE FOR CARRYING OUT THE INVENTION

Figure 1:
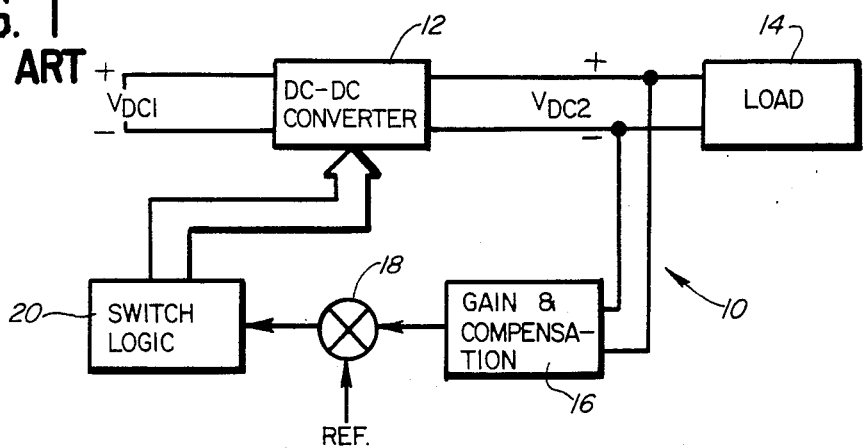
FIG. 1 is a block diagram of a prior art DC-DC converter in conjunction with a load.

Referring now to FIG. 1, a power converter 10 includes a DC-DC converter 12 which converts DC input power at a first level or voltage $V_{DC1}$ into output DC power at a second level or voltage $V_{DC2}$ which is in turn coupled to a load 14. The DC-DC converter 12 includes a plurality of power switches which are operated by control circuitry comprising a gain and compensation circuit 16 which receives the output voltage $V_{DC2}$, a summing junction 18 which generates an error signal by subtracting from the output of the circuit 16 a reference signal $V_{ref}$ and a switch logic circuit 20 which controls the conduction of the switches in the converter 12 based upon the error signal.

Figure 2:
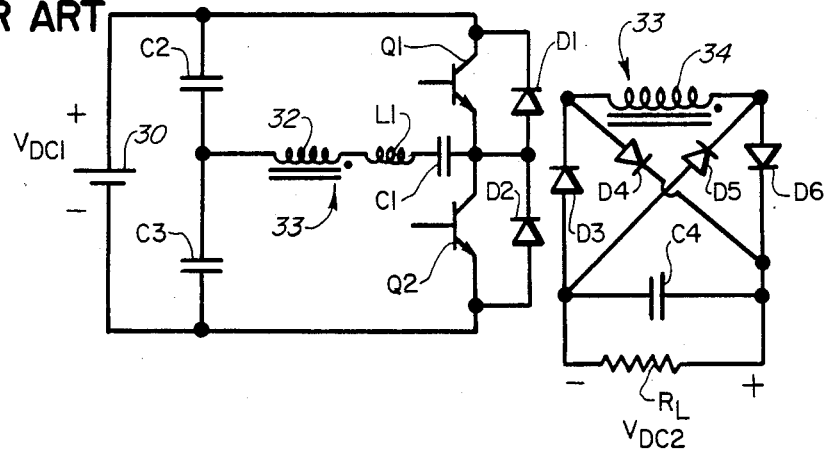
FIG. 2 is a simplified schematic diagram of a prior art series-resonant half-bridge DC-DC converter.

Referring now to FIG. 2, there is illustrated a prior art DC-DC converter which is utilizable in the system shown in FIG. 1. A primary section of the converter includes first and second power switches Q1 and Q2 which are rendered alternately conductive to connect a DC source 30 to a series resonant circuit comprising a capacitor C1, an inductor L1 and a primary winding 32 of a transformer 33. A pair of capacitors C2 and C3 divide the voltage $V_{DC1}$ in half and dissipate regenerative currents caused by switching of the power switches Q1 and Q2. A pair of flyback diodes D1 and D2 are connected in antiparallel relationship with the switches Q1 and Q2.

A secondary section of the converter comprises a secondary winding 34 of the transformer 33, diodes D3–D6 connected in a full wave rectifier bridge configuration, an output filter comprising a capacitor C4 and a load represented by a resistor $R_L$.

The switches Q1 and Q2 are operated in alternate fashion at a frequency near the resonant frequency of the series-resonant circuit so that sinusoidal current is developed in the primary winding 32 of the transformer 33. The sinusoidal current induced in the secondary winding 34 of the transformer 33 is converted into the DC output by the full wave rectifier comprising the diodes D3–D6, and the filter capacitor C4.

Figure 3:
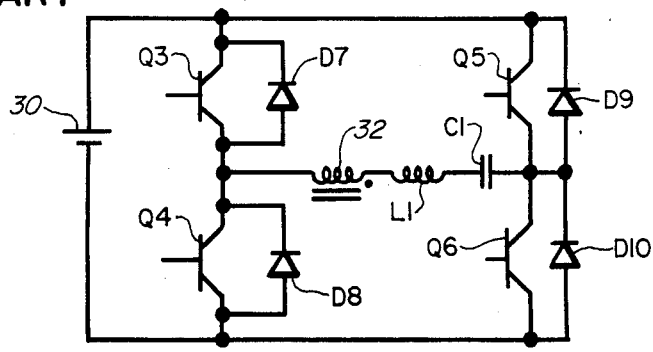
FIG. 3 is a simplified schematic diagram of the primary stage of a series-resonant, full-bridge DC-DC converter.

The configuration of the converter shown in FIG. 2 is referred as a half-bridge configuration. Alternatively, a full-bridge configuration may be used as seen in FIG. 3 wherein the switches Q1 and Q2 and the capacitors C2 and C3 are replaced by switches Q3–Q6. The switches Q3 and Q6 are operated together in alternating fashion with the switches Q4 and Q5 so that an alternating voltage having a peak to peak value equal to twice the voltage produced by the DC source 30 is applied across the series-resonant circuit comprising the capacitor C1, the inductor L1 and the primary winding 32.

The secondary section of the full-bridge converter, while not illustrated in FIG. 3, is identical to that shown in FIG. 2.

The prior art devices illustrated in FIGS. 2 and 3 suffer from various disadvantages. In particular, in high power applications the power switches Q1 and Q2 or Q3–Q6 must have a high current rating or must comprise parallel-connected devices to obtain the proper current handling capacity. Such parallel operation is subject to various disadvantages as previously noted.

Furthermore, the sizes of the input and/or output filters must be typically quite large to filter a high percentage of ripple. This can be an extreme disadvantage in installations requiring light weight.

Figure 4:
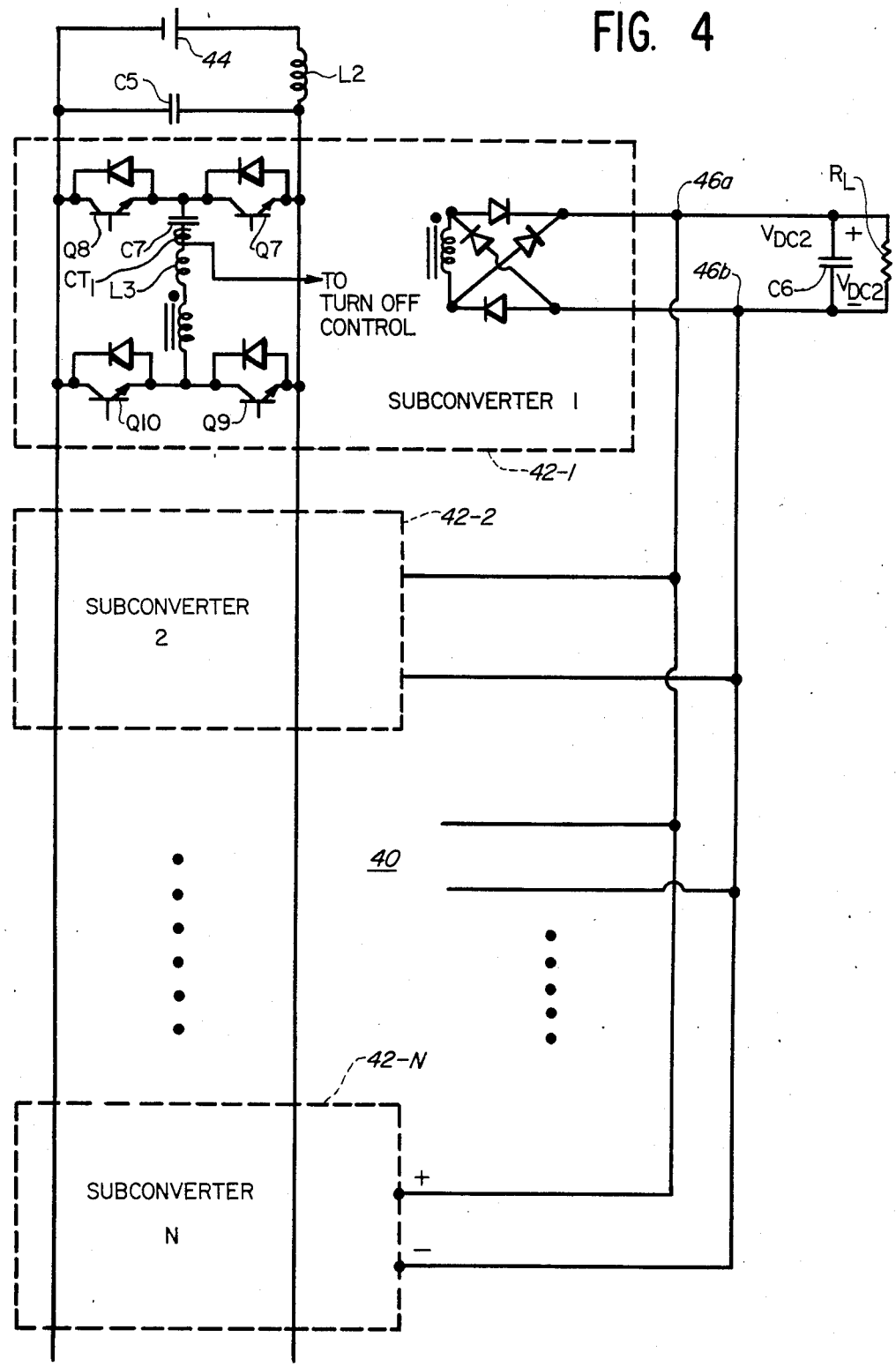
FIG. 4 is a circuit diagram, partly in schematic and partly in block diagram form, of a DC-DC converter according to the present invention.

Referring now to FIG. 4, a DC-DC converter 40 according to the present invention comprises a plurality of N subconverters 42-1, 42-2, . . ., 42-N. Each subconverter may be of the half-bridge or full-bridge type as illustrated in FIGS. 2 or 3 which converts the voltage $V_{DC1}$ provided a DC source 44 into a subconverter output voltage.

The switches in each subconverter 42 are operated by a switch control (described in greater detail hereinafter in connection with FIG. 8) so that a phase displacement of $2\pi/N$ electrical degrees exists between the output currents developed by successive subconverters. The outputs of the subconverters 42 are connected together in parallel with one another and with a filter capacitor C6 and the load $R_L$ by summing means comprising nodes 46a, 46b.

Figure 5:
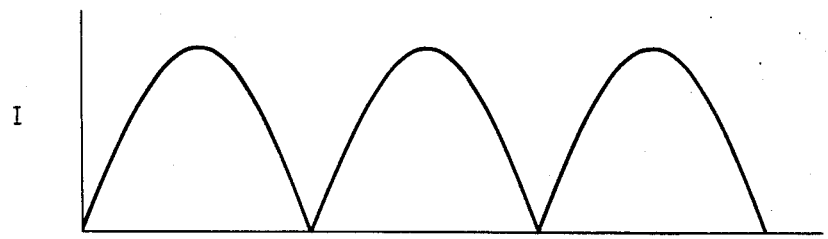
FIG. 5 is a waveform diagram of the current developed by the prior art converter shown in FIG. 2.

FIG. 5 illustrates the output current from one of the prior art converters shown in either FIG. 2 or FIG. 3. For clarity, the waveform is shown for the case where the switching frequency $f_s$ of the switches in the converter is equal to the resonant frequency $f_r$ of the series-resonant circuit. In this case, the output current comprises a full-wave rectified sine-wave which requires a relatively large output filter to convert same into a DC level.

Figure 6:
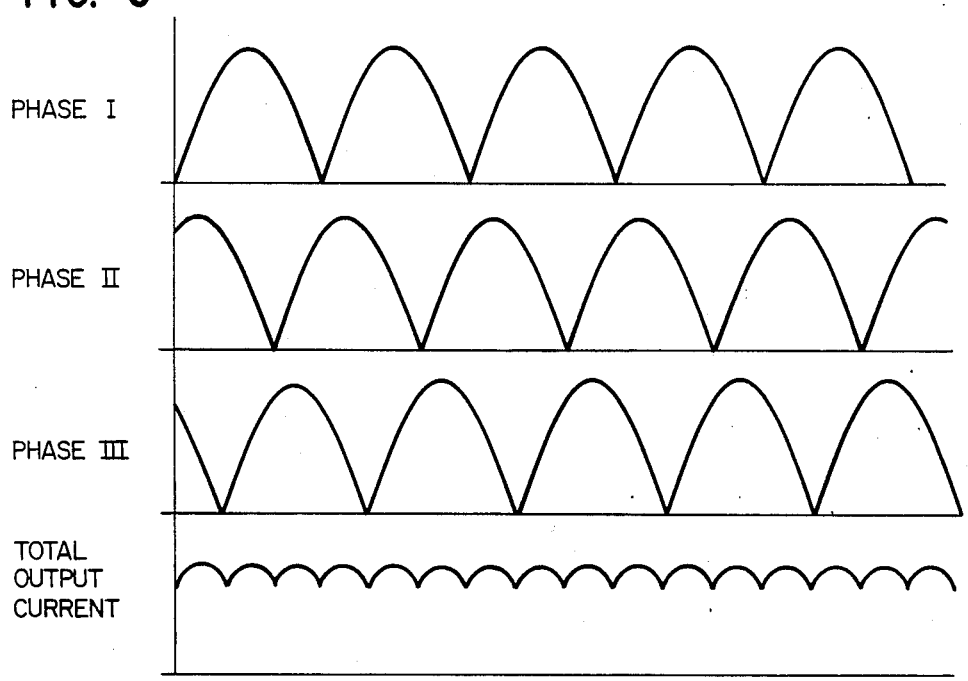
FIG. 6 is a series of waveform diagrams illustrating the current developed by a converter according to the present invention having three subconverters.

In contrast with the waveform of FIG. 5, FIG. 6 discloses the subconverter output and overall converter output waveforms produced by a DC-DC converter according to the present invention where N equals 3 and where the switching frequency $f_s$ is equal to one-half the resonant frequency $f_r$ of the series-resonant circuits in each of the subconverters 42.

As seen in FIG. 6, the switches in one of the subconverters are operated with a phase displacement of $2\pi/3$ electrical degrees with respect to the switches in the remaining subconverters. The total output current comprising the sum of the individual outputs of the three subconverters includes a series of peaks superimposed on a DC level. These peaks form a ripple component which is more easily filtered than the ripple component shown in FIG. 5.

Figure 7:
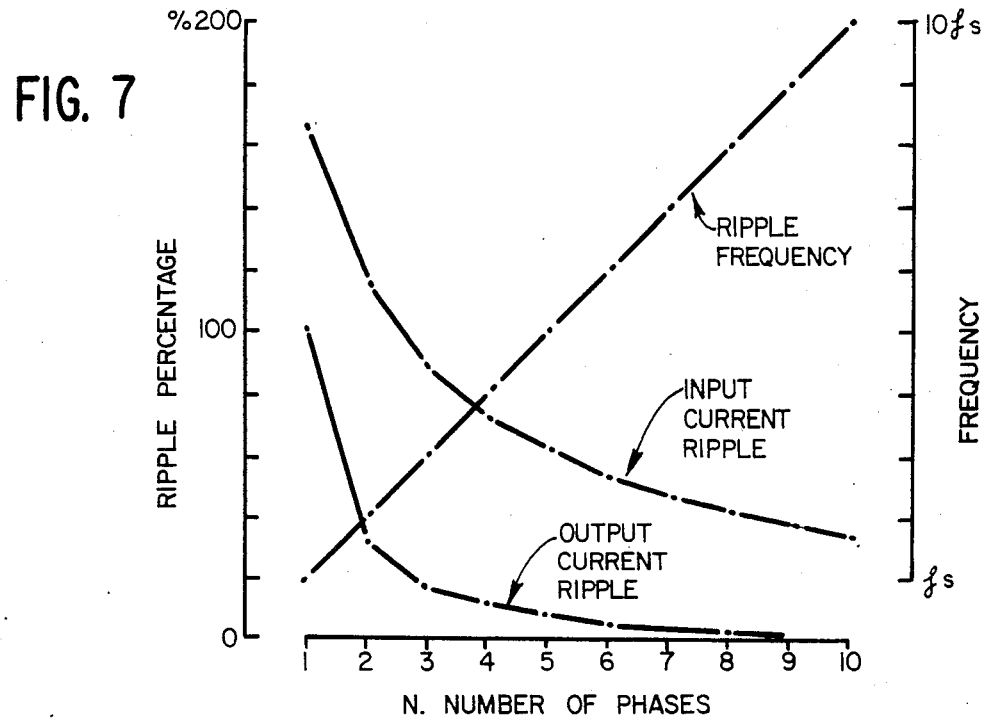
FIG. 7 is a graph illustrating input and output current ripple content and ripple frequency as a function of the number N of subconverters in a converter according to the present invention.

In fact, as seen in FIG. 7, the amplitude of the ripple component in the output of the DC-DC converter of the present invention expressed as a percentage of the ripple amplitude in the output of a prior art converter providing the same DC output level decreases approximately exponentially as N increases. This is substantially also the case in terms of the input ripple created by the switching of the power switches in each of the subconverters. Also, ripple frequency linearly increases with N, as would be expected.

A significant benefit resulting from the reduction in the amplitude of input and output current ripple with increasing N is that the size of the input filter comprising an inductor L2 and a capacitor C5 and the size of the output filter comprising the capacitor C6 may be substantially reduced as N is increased. This reduction in size is further facilitated by the increase in ripple frequency as N is increased. For example, where N equals 10, the ripple percentage as determined by the following equation:

$$\text{ripple percentage} = [(I_{MAX} - I_{MIN})/I_{MAX}] \times 100\%$$

where $I_{MAX}$ and $I_{MIN}$ are the maximum and minimum current levels in the input and output current waveforms, is reduced to approximately 1.6% of the peak value of the maximum of the total output current. Further, the increase in ripple frequency by a factor of 10 results in a reduction in the size of the output capacitor by approximately a factor of 700 and a reduction in the size of the input filter as well.

Other advantages accrue from the fact that the switches in each of the subconverters handle smaller current levels for a given output DC level as compared with the switches in a prior art converter providing the same level. Furthermore, the size and weight of each of the transformers in the subconverters will be only 1/N of the size and weight of the transformer which would be required in the conventional converter. Therefore, the increase in the number of transformers is offset by a reduction in size and weight of each.

Figure 8:
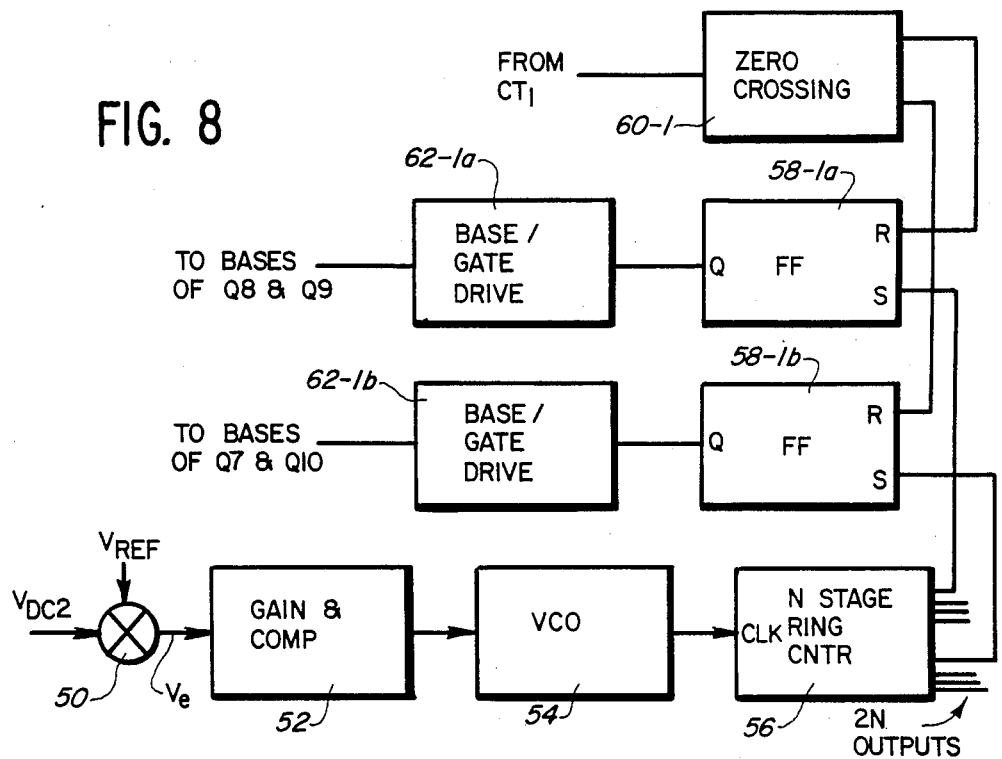
FIG. 8 is a block diagram of a control for operating the switches Q7–Q10 shown in FIG. 4.

Referring now to FIG. 8, there is illustrated a block diagram of a control for operating the switches in the subconverters shown in FIG. 4. The control is initially described for the case where the switching frequency $f_s$ is less than the resonant frequency $f_r$ and wherein the subconverters are each of the full-bridge type as illustrated in FIG. 4.

The output voltage of the converter $V_{DC2}$ is compared against a reference voltage $V_{REF}$ by a summing junction 50 which develops in response thereto an error voltage $V_e$. This error voltage is modified by a gain and compensation circuit 52 and is applied to the input of a voltage controlled oscillator, or VCO 54. The VCO 54 develops a clock signal having a frequency related to the magnitude of the error voltage $V_e$, which clock signal is applied to the input of an N stage ring counter 56.

The ring counter 56 develops a series of 2N outputs, each of which are coupled to the set input of a set-reset or SR flip-flop, two of which 58-1a and 58-1b are illustrated in FIG. 8. The reset inputs of these flip-flops receive a pair of outputs developed by a zero crossing circuit 60-1 which in turn receives a signal from a current transformer such as the transformer $CT_1$ illustrated in FIG. 4. A first output of the zero crossing circuit 60-1 is coupled to the reset input of the flip-flop 58-1a and assumes a high state when the current through the series resonant circuit passes through zero from a positive to a negative direction. The second output from the zero crossing circuit 60, which is coupled to the reset input of the flip-flop 58-1b, is an inverted version of the first output, i.e. this output assumes a low state when the current through the series resonant circuit passes through zero from a positive value toward a negative value.

The flip-flops 58 generate control signals to control the operation of switches Q8,Q9 and Q7–Q10, respectively in the subconverter 42-1. The control signals are first conditioned by base/gate drive circuits 62-1a, 62-1b before they are applied to the bases of these transistors.

The control illustrated in FIG. 8 turns off those switches that are on when the current therethrough drops to zero so that switching stresses are reduced. In such a case, switches are turned on when the current in the resonant circuit is nonzero. Alternatively, the control of FIG. 8 may be used to turn on the switches when the current through the series-resonant circuit is zero by reversing the connections to the set and reset inputs of the flip-flops 58, if desired. In this case, the switches would be turned off when the current therethrough is not equal to zero. This mode of operation results in a switching frequency $f_s$ greater than the resonant frequency $f_r$ of the series-resonant circuit.

The switch control for the remaining subconverters comprises current transformers $CT_2$–$CT_N$, zero crossing circuits 60-2 through 60-N, flip-flops 58-2a,58-2b through 58-Na, 58-Nb and base/gate drive circuits 62-2a, 62-2b through 62-Na,62-Nb which are connected to the 2N - 2 remaining outputs of the N stage ring counter 56 in a fashion similar to that described above in connection with the elements $CT_1$,58-1a,58-1b,60-1,62-1a and 62-1b.

In the event that the subconverters each comprises a half-bridge inverter, the outputs of the base/gate drive circuit 62 would control only one switch in each subconverter as opposed to diagonally opposite pairs of switches.

Figure 9:
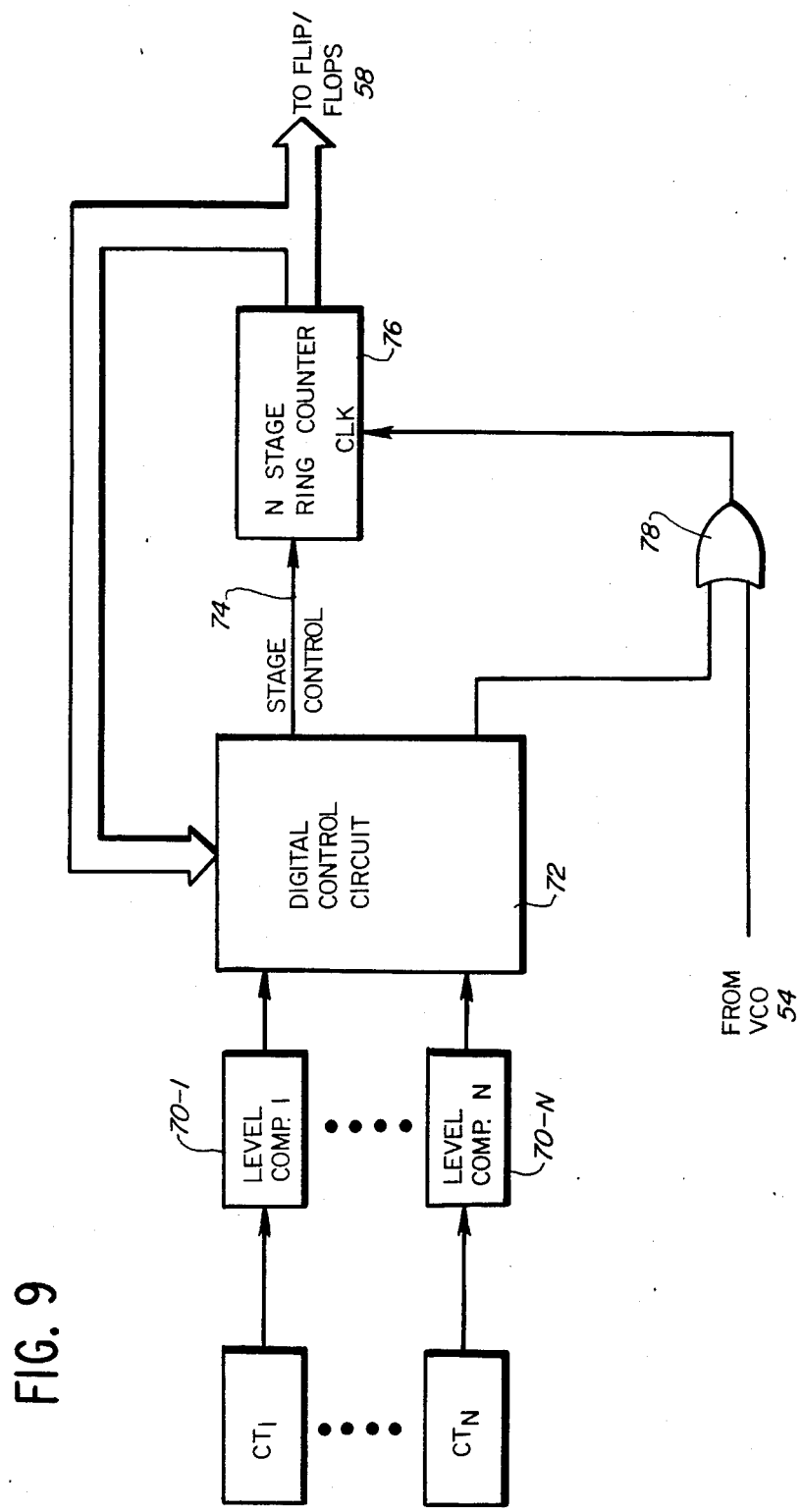
FIG. 9 is a block diagram of circuitry which may be added to the circuitry shown in block diagram form in FIG. 8 for operating the converter shown in FIG. 4 in the event of a malfunction of one or more of the subconverters.

Referring now to FIG. 9, the circuitry shown in block diagram form in FIG. 8 may be modified to permit continued control over the output voltage of the converter even in the event of a malfunction of one or more of the subconverters 42. In this embodiment of the invention, the outputs from the current transformers $CT_1$–$CT_N$ are coupled to a series of level comparators 70-1 through 70-N, respectively, which are in turn coupled to a digital control circuit 72. The digital control circuit 72, which may be a microprocessor, detects the outputs of the level comparators 70 in order to determine whether one or more of the subconverters has malfunctioned, as indicated when the current through the resonant circuit of each subconverter drops below or surges above a particular level. When the control circuit 72 detects a malfunction of one or more of the subconverters, a signal is generated over a stage control bus 74 to a stage control input of an N stage ring counter 76 which replaces the ring counter 56 shown in FIG. 8. The ring counter 76 includes a clock input CLK which is coupled to the output of an OR gate 78. One input to the OR gate 78 is coupled to the output of the VCO 54 shown in FIG. 8 while a second input of the OR gate 78 receives an output of the control circuit 72.

When the subconverters are all operating satisfactorily, a low state signal is coupled to the OR gate 78 from the control circuit 72. During this time, therefore, the ring counter 76 accumulates the clock pulses from the VCO 54 in a fashion similar to that described in connection with FIG. 8. If, however, a malfunction occurs, for example, in one of the subconverters, a different binary control signal is sent over the stage control bus to the stage control input of the ring counter 76, causing the ring counter to operate as an N - 1 stage ring counter. In addition, a fast impulse signal is provided by the control circuit 72 to the OR gate 78 at appropriate times to cause the ring counter output to bypass the output thereof that controls the switches in the disabled subconverter.

Furthermore, when one or more of the subconverters malfunctions, the combined voltage output from the remaining subconverters drops, thereby causing an increase in the error signal $V_e$ generated by the summing junction 50. This in turn increases (or decreases) the frequency of the output of the VCO 54 to cause the switches in the operative subconverters to operate at a higher (or lower) frequency to restore the error signal to a zero level. The control circuit 72 therefore comprises means for detecting one or more malfunctioning subconverters while the summing junction 72 and VCO 54 comprise means for increasing (or decreasing) the frequency of operation of the inverters in the remaining, operative subconverters 42 to maintain the DC output power at a specified level.

In effect, the control circuit 72 converts the operation of the counter 76 from an N stage ring counter into an N–X stage ring counter when X subconverters have malfunctioned. Further, the operation of the remaining N–X operative subconverters is adjusted to thereby permit continued generation of the output power at the specified level.

What is claimed is:

1. A DC-DC converter for converting input DC power from a DC source into output DC power at a certain level, comprising:
    a plurality of N successive DC-DC sine wave resonant subconverters each for converting the input DC power into a subconverter output having a ripple component at a particular frequency;
    means for operating the N subconverters so that a phase displacement of $2\pi/N$ electrical degrees exists between output currents of successive subconverter outputs; and
    means for summing the subconverter outputs to develop output power having a ripple component at a frequency equal to N times the frequency of a subconverter output ripple component.

2. The DC-DC converter of claim 1, further including an output filter connected to the summing means for filtering the output power ripple component.

3. The DC-DC converter of claim 1, further including means for detecting a malfunctioning subconverter and means responsive to the detecting means for changing the frequency of operation of the remaining subconverters to maintain the DC output power at the specified output level.

4. A power converter for converting input power supplied by a power source into output power at a specified level, comprising:
  a plurality of N sine wave resonant subconverters for converting the input power into a plurality of subconverter outputs, each subconverter including at least one switch operated at a controllable frequency to develop intermediate AC power at a phase displacement of $2\pi/N$ electrical degrees with respect to the AC power of other subconverters;
  means for combining the subconverter outputs to develop the output power; and
  means for operating the subconverters including means for detecting a malfunction of one of the subconverters and means for adjusting the frequency of operation of the switches in the remaining subconverters when the malfunction is detected to maintain the output power at the specified level.

5. A DC-DC converter for converting DC input power from a DC source into DC output power at a specified level, comprising:
  a plurality of N DC-DC sine wave resonant subconverters each coupled to the DC source and including
  a sine wave resonant inverter for converting the DC input power into AC power and having at least one power switch and
  a rectifier coupled to the inverter output for converting the AC power into a subconverter DC output;
  means for summing together the N subconverter DC outputs to produce the DC output power; and
  means for operating the subconverter inverters at a phase displacement of $2\pi/N$ electrical degrees in the AC power from each inverter relative to the AC power from other inverters including means for developing an error signal representing the deviation of a parameter of the DC output power from a desired level, a voltage controlled oscillator (VCO) responsive to the error signal for developing a VCO clock signal at a frequency related to the magnitude of the error signal, means for sensing the AC power developed by each subconverter inverter and means responsive to the VCO clock signal and to the sensing means for controlling the subconverter inverter switches to minimize the deviation of the DC output power parameter from the desired level.

6. The DC-DC converter of claim 5, wherein the operating means includes means for detecting a malfunctioning subconverter and means for changing the frequency of operation of the inverters in the remaining subconverters when such malfunction is detected to maintain the DC output power at the specified level.

7. The DC-DC converter of claim 5, further including an output filter connected to the summing means for filtering the summed subconverter outputs.

8. The DC-DC converter of claim 5, further including a ring counter coupled to the output of the voltage controlled oscillator having 2N outputs and wherein the controlling means includes N pairs of flip-flops each pair of associated with one subconverter, wherein each flip-flop controls a switch in the associated subconverter and includes a set input which receives an output of the ring counter and a reset input which receives an output from the sensing means.

9. The DC-DC converter of claim 8, wherein the ring counter is of the variable-stage type having a stage control input and wherein the converter further includes a control circuit responsive to the sensing means and coupled to the ring counter stage control input for causing the counter to operate as an N-X stage counter when X subconverters have malfunctioned.

10. The DC-DC converter of claim 9, wherein the ring counter includes a clock input and the control circuit includes an output at which an impulse signal is developed when at least one of the subconverters has malfunctioned and further including an OR gate having first and second inputs which receive the VCO clock signal and the impulse signal, respectively, and an output coupled to the ring counter clock input.

* * * * *